US008933685B2

(12) United States Patent
Adeeb et al.

(10) Patent No.: US 8,933,685 B2
(45) Date of Patent: Jan. 13, 2015

(54) PROTECTION SYSTEM AND METHOD FOR DC-DC CONVERTERS EXPOSED TO A STRONG MAGNETIC FIELD

(75) Inventors: Mohammad Ahsanul Adeeb, High Point, NC (US); John Endredy, Whitsett, NC (US); Christopher Truong Ngo, Queen Creek, AZ (US); Ashraf Rozek, Greensboro, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 85 days.

(21) Appl. No.: 13/426,947

(22) Filed: Mar. 22, 2012

(65) Prior Publication Data

US 2012/0242308 A1    Sep. 27, 2012

Related U.S. Application Data

(60) Provisional application No. 61/466,116, filed on Mar. 22, 2011.

(51) Int. Cl.
*H02M 3/156*    (2006.01)
*H02M 1/32*    (2007.01)
*H02M 1/00*    (2006.01)

(52) U.S. Cl.
CPC ............... *H02M 1/32* (2013.01); *H02M 3/156* (2013.01); *H02M 2001/0045* (2013.01)
USPC ............................. 323/350; 323/268; 323/285

(58) Field of Classification Search
CPC .................. G05F 1/46; H02M 3/1588; H02M 2001/0045
USPC ......... 323/266, 268, 270, 271, 282–285, 350; 361/18, 90
See application file for complete search history.

(56) References Cited

U.S. PATENT DOCUMENTS

| 6,229,289 | B1 * | 5/2001 | Piovaccari et al. | 323/268 |
| 6,441,591 | B2 * | 8/2002 | Nokkonen | 323/266 |
| 7,609,039 | B2 * | 10/2009 | Hasegawa | 323/273 |
| 7,679,346 | B2 * | 3/2010 | Lin et al. | 323/282 |
| 7,759,916 | B2 * | 7/2010 | Kleveland | 323/268 |
| 7,763,994 | B2 * | 7/2010 | Inomoto | 307/75 |
| 7,898,235 | B2 * | 3/2011 | Seo | 323/284 |
| 7,990,119 | B2 * | 8/2011 | Petty | 323/273 |
| 2006/0087303 | A1 * | 4/2006 | Hartular et al. | 323/283 |
| 2010/0123443 | A1 * | 5/2010 | Grimm | 323/282 |
| 2011/0316502 | A1 * | 12/2011 | Tang et al. | 323/271 |
| 2012/0223691 | A1 * | 9/2012 | Weinstein et al. | 323/283 |
| 2012/0293156 | A1 * | 11/2012 | Galbis et al. | 323/350 |

* cited by examiner

*Primary Examiner* — Gary L Laxton
*Assistant Examiner* — Kyle J Moody
(74) *Attorney, Agent, or Firm* — Withrow & Terranova, P.L.L.C.

(57) ABSTRACT

A protection system and method for protecting a direct current to direct current voltage converter (DC-DC converter) from a potentially damaging excessive output current due to exposure to a relatively strong magnetic field is disclosed. The system includes a detector circuit configured to monitor a signal characteristic of the DC-DC converter, and a linear regulator having an output coupled to the load output of the DC-DC converter. The system further includes a control system configured to disable a load output of the DC-DC converter and enable the output of the linear regulator when the detector detects that the signal characteristic has moved outside a predetermined threshold range. Moreover, the control system is further configured to disable the output of the linear regulator after a predetermined time period, and enable the load output of the DC-DC converter after the predetermined time period.

20 Claims, 17 Drawing Sheets

US 8,933,685 B2

PROTECTION SYSTEM AND METHOD FOR DC-DC CONVERTERS EXPOSED TO A STRONG MAGNETIC FIELD

RELATED APPLICATIONS

This application claims the benefit of U.S. provisional patent application No. 61/466,116, filed Mar. 22, 2011, the disclosure of which is incorporated herein by reference in its entirety.

FIELD OF THE DISCLOSURE

The present disclosure relates to protecting direct current to direct current voltage converters (DC-DC converters) exposed to strong magnetic fields.

BACKGROUND

A direct current to direct current voltage converter (DC-DC converter) can become unreliable and potentially unsafe if exposed to a strong magnetic field. Wireless charging pads for mobile devices generate strong magnetic fields that may result in unreliable and unsafe operation of DC-DC converters. Moreover, permanent magnets such as those used to hold close the cover of mobile phone pouches and cases can expose a DC-DC converter to a strong magnetic field. DC-DC converters used in low-power and ultra-compact mobile applications typically employ at least one output filter comprising small surface-mount inductors. The inductance value of a small surface-mount inductor decreases in the presence of a strong magnetic field. As a result, an excessively increasing current is drawn through the inductor as long as the strong magnetic field is present. This excessively increasing current can lead to potentially unsafe operation of the DC-DC converter and even the destruction of the active circuitry such as switching field effect transistors (FETs) and supporting external components. Therefore, a need exists to detect an excessively increasing current output from a DC-DC converter before the current reaches a level that would potentially damage the DC-DC converter and to protect the DC-DC converter by disabling its output. A need also exists for replacing the disabled DC-DC converter output voltage with an output voltage of another source that is not sensitive to an external magnetic field.

SUMMARY

A protection system for protecting a direct current to direct current voltage converter (DC-DC converter) from a potentially damaging excessive output current due to exposure to a relatively strong magnetic field is disclosed. The protection system includes a detector circuit configured to monitor a signal characteristic of the DC-DC converter and a linear regulator having an output coupled to the load output of the DC-DC converter. A control system is configured to disable a load output of the DC-DC converter and enable the output of the linear regulator when the detector circuit detects that the signal characteristic has moved outside a predetermined threshold range. Moreover, the control system is also configured to disable the output of the linear regulator after a predetermined time period following a disabling of the load output of the DC-DC converter and then enable the load output of the DC-DC converter after the predetermined time period.

The present disclosure also provides a method of protecting a DC-DC converter from a potentially damaging excessive output current due to exposure to a relatively strong magnetic field. The method comprises steps of monitoring a signal characteristic of the DC-DC converter via a detector circuit and disabling a load output of the DC-DC converter via a control system when the detector circuit detects that the signal characteristic has moved outside a predetermined threshold range. The method continues by enabling an output of a linear regulator via the control system to replace the load output of the DC-DC converter. The present disclosure further provides steps of disabling the output of the linear regulator via the control system after a predetermined time following a disabling of the load output of the DC-DC converter and enabling the load output of the DC-DC converter via the control system.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION OF THE DISCLOSURE

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Effects of Strong Magnetic Fields on DC-DC Converters

Figure 1:
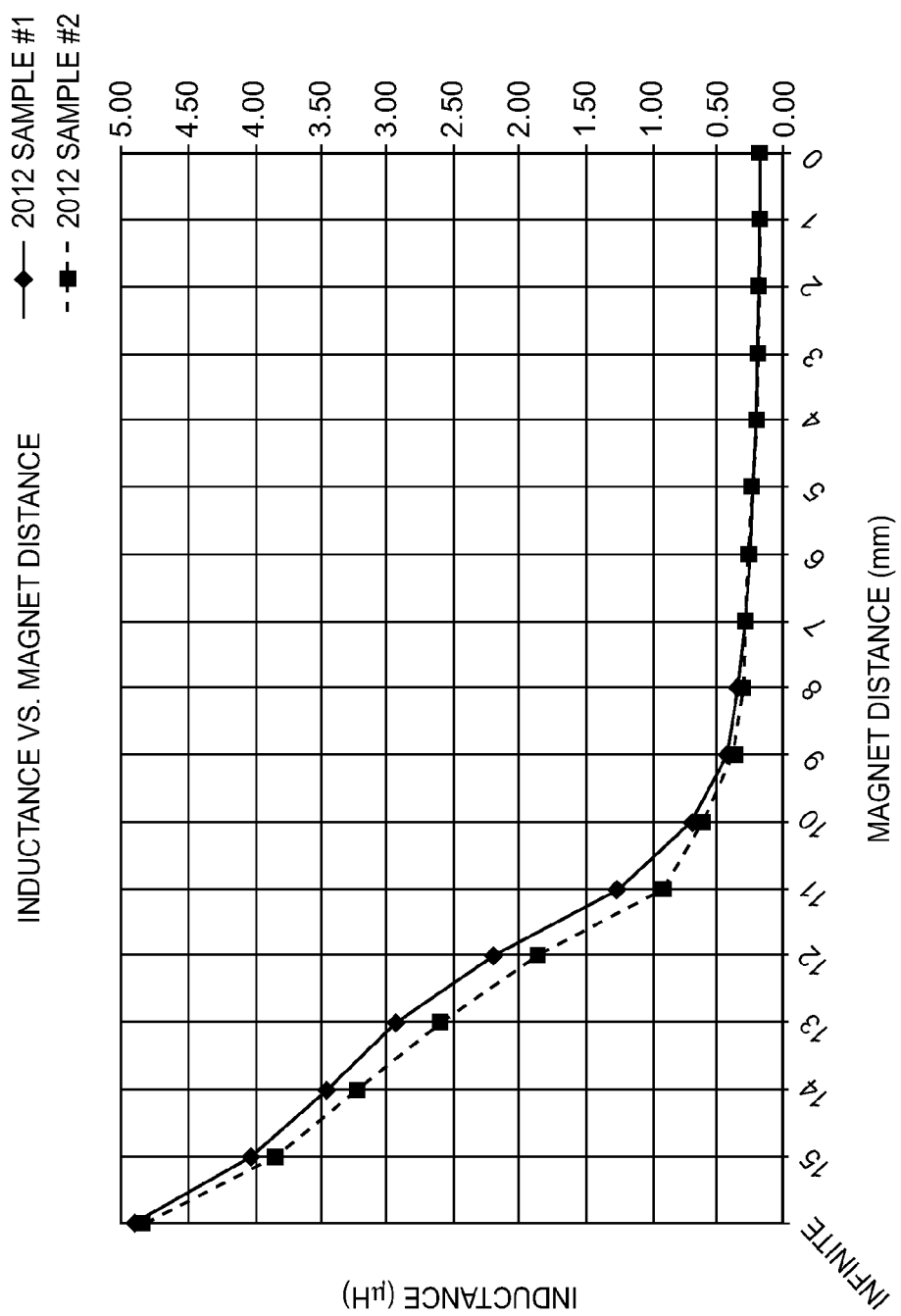
FIG. 1 is a graph of inductance versus a distance of separation between a permanent magnet and surface mount device (SMD) inductor samples.

The effect of a strong magnetic field on a direct current to direct current voltage (DC-DC) converter is directly linked to the strong magnetic field's effect on a surface mount device (SMD) inductor. The effect of a strong external magnetic field on the inductance of an inductor can be explored using a powerful permanent magnet such as a neodymium disc magnet. FIG. 1 is a plot of the measured inductance as a function of the magnet distance from two inductor samples. The data plotted in FIG. 1 was collected by placing the neodymium disc magnet at a radial distance from the longitudinal axes of 4.7 µH multi-layer inductor samples in a 2012 size packages with one of the magnet's flat surface facing the inductor sample of each test run. The distance between each inductor sample and the disc magnet was gradually decreased and the inductance of the inductor was measured using an inductor, capacitor, resistance (LCR) meter over a range of distances shown in FIG. 1. The disc magnet used to collect the data was a 20 g neodymium magnet having a magnetic surface field of 5200 Gauss having poles on the disc's flat ends.

Notice that the inductance of both inductor samples drops relatively sharply until magnetic field saturation begins when the disc magnet is at around a 10 mm radial distance from each inductor sample. When the disc magnet is at around 1 mm radial distance from each inductor sample, the inductance of each inductor sample has dropped off to around 0.18 µH. Thus, each inductor sample has lost at least 96% of its original inductance value while the disc magnet is around 1 mm radial distance from each inductor sample. The inductance of each inductor sample returns to its original value once the magnetic field of the magnet no longer significantly couples with each inductor sample.

Analysis of a Related Art Pulse Width Modulation (PWM) DC-DC Converter

Figure 2A:
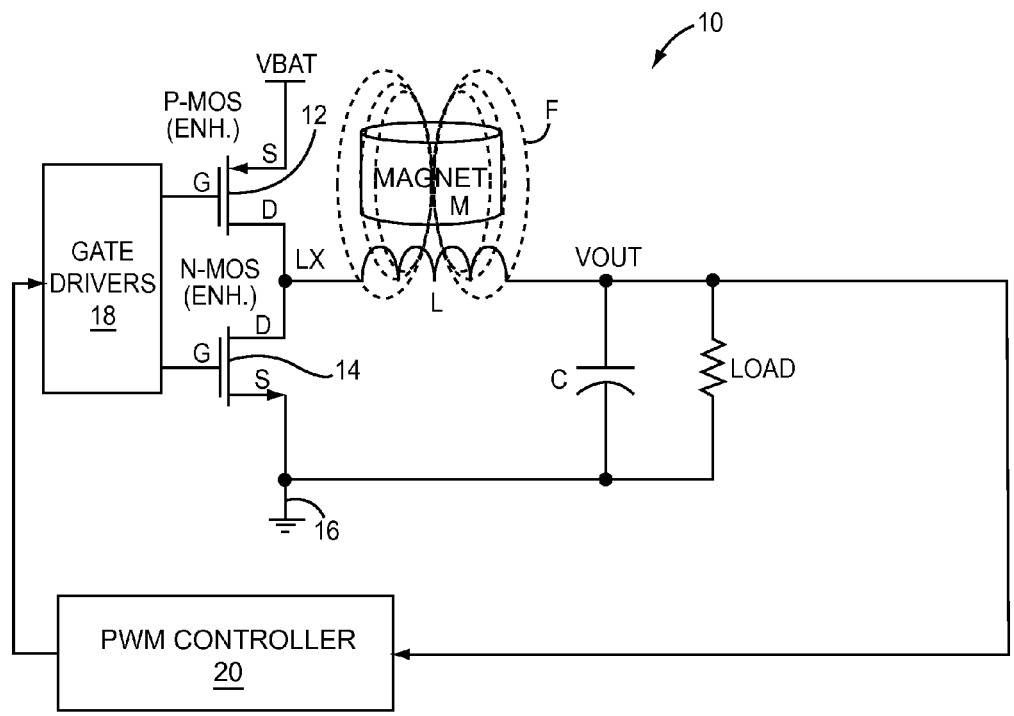
FIG. 2A is a simplified block diagram of a pulse width modulation (PWM) DC-DC converter.

Such a dramatic loss of inductance can have a serious detrimental effect on an inductor based DC-DC converter. An analysis of the operation of a typical inductor based DC-DC converter will demonstrate this detrimental effect. FIG. 2A is a simplified block diagram of a related art PWM DC-DC converter 10 that comprises a first field effect transistor (FET) 12 and a second FET 14. The first FET 12 and the second FET 14 are typically enhancement mode metal oxide semiconductor FETs (MOSFETs). The first FET 12 has a source coupled to a voltage source VBAT and a drain coupled to a switching node LX. The second FET 14 has a drain coupled to the switching node LX and a source coupled to a common node 16. A gate drivers circuit 18 drives a gate of the first FET 12 and a gate of the second FET 14. A PWM controller 20 is coupled to the gate drivers circuit 18 to control the phase and frequency of switching pulses that are output from the gate drivers circuit 18 that drive the gates of the first FET 12 and the FET 14. The PWM controller 20 receives voltage feedback from an output node VOUT. A LOAD and a filter capacitor C is coupled in parallel between the output node VOUT and the common node 16. An inductor L is coupled between the switching node LX and the output node VOUT. A magnet has a magnetic field M that couples with the inductor L as the magnet approaches the inductor L.

Figure 2B:
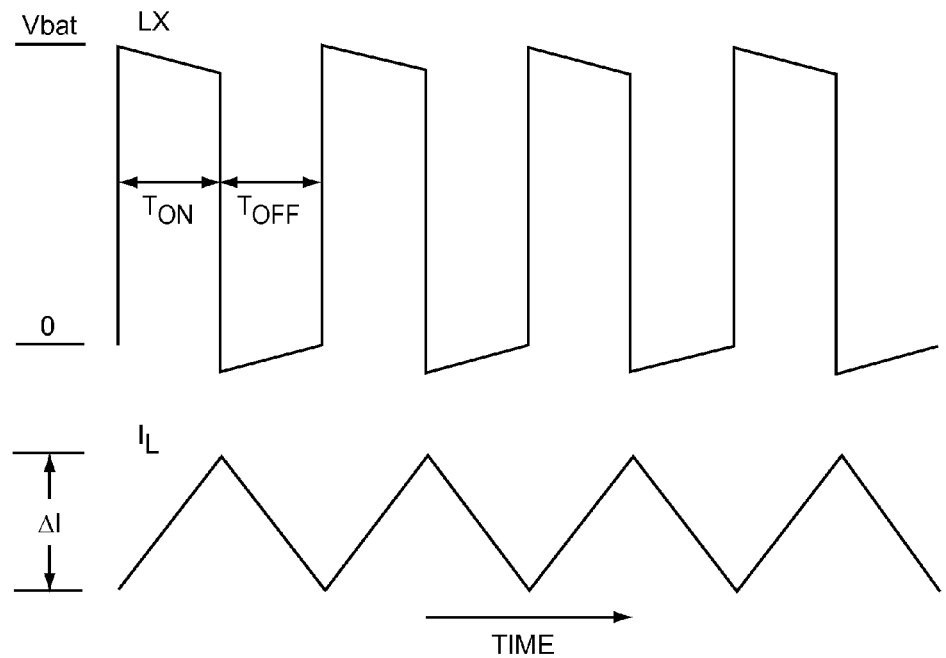
FIG. 2B is plot of waveforms associated with the normal operation of the PWM DC-DC converter of FIG. 2A.

Referring to FIG. 2B, the output voltage of a PWM DC-DC converter is defined by, $$\Delta I = \frac{Vout(1-D)}{fL}$$

where, $f$ = switching frequency $L$ = inductance of the inductor and peak-to-peak inductor current is defined by, $$\Delta I = \begin{cases} 53 \text{ mA for } L = 4.7 \text{ µH (no magnet present)} \\ 1389 \text{ mA for } L = 0.18 \text{ µH (magnet at 0-1 mm distance)} \end{cases}$$

The equation above indicates that the peak-to-peak inductor current is inversely proportional to the inductance assuming everything else is constant. For Vbat=3.8V, Vout=2.875V and f=2.8 MHz, $$Vout = D \cdot Vbat$$

where, $D = \frac{T_{ON}}{T_{OFF}}$ = duty cycle of the switching pulses.

Such a relatively large increase in inductor current under the presence of a strong magnetic field results in a relatively excessive amount of voltage drop across the first FET 12 and the second FET 14 and direct current resistance (DCR) of the inductor L. Consequently, a significant increase in the duty cycle of the switching pulses is needed to maintain the output voltage VOUT. For PWM DC-DC converters with a high duty ratio such as in the example presented here, this may even push the required duty cycle in excess of 100%, forcing the converter to skip pulses and even fall into a dropout mode. The increased duty cycle, which may also result in a reduced effective switching frequency, further increases the inductor current peaks before the inductor current becomes limited by the resistances of the first FET 12 and the second FET 14.

Figure 3:
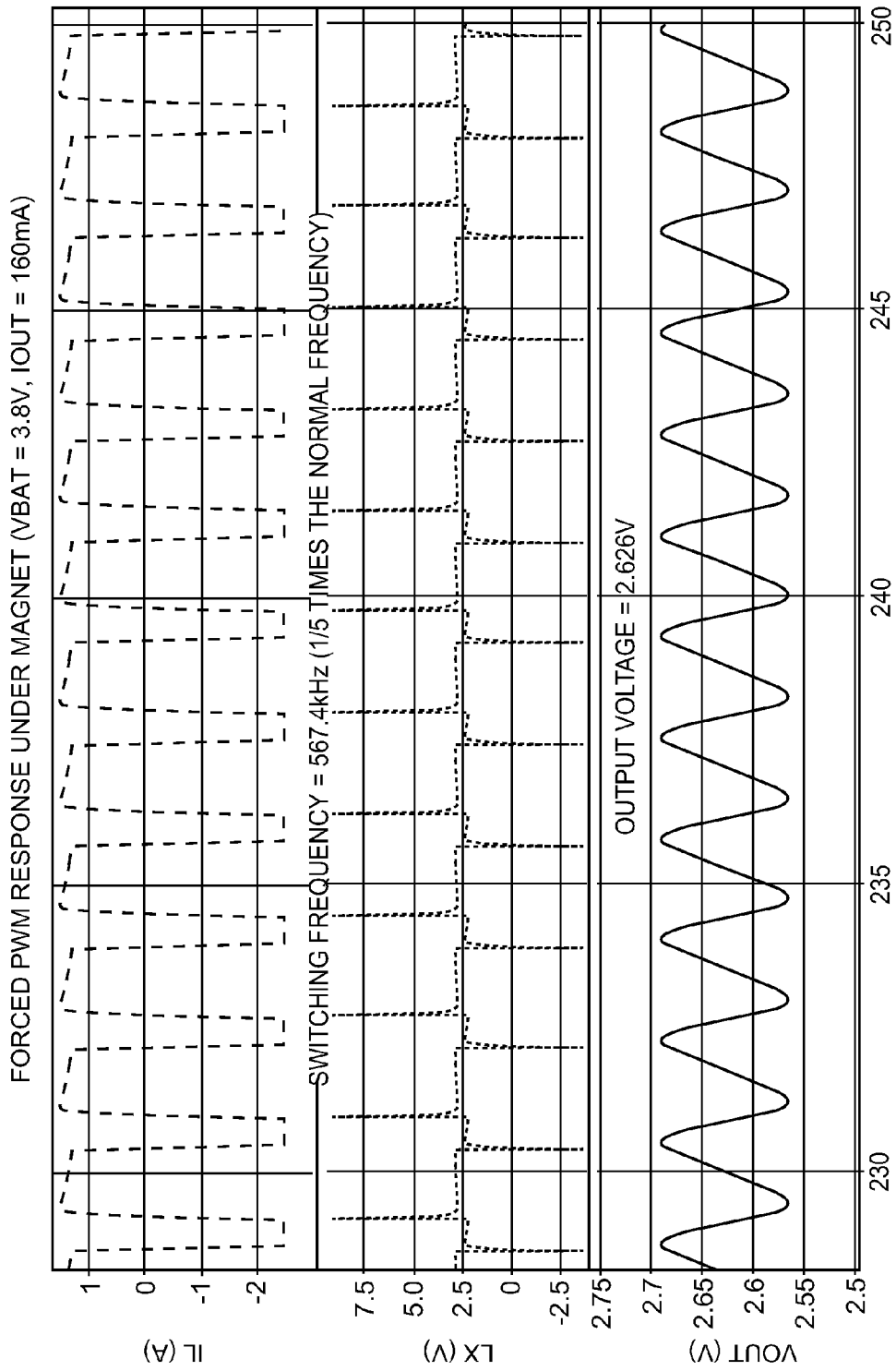
FIG. 3 is a plot of inductor current, switching node voltage, and output voltage for a PWM DC-DC converter under the effect of a strong magnetic field.

FIG. 3 is a graph that shows some simulated waveforms that illustrate the magnetic field's effect on a 2.875V PWM DC-DC converter operating at a battery voltage of 3.8V. The top waveform is inductor current IL in amperes. In this case, the peak-to-peak inductor current IL is over 3 A, which may exceed a current rating for components typically used for the PWM converter 10 (FIG. 2A). The middle waveform represents voltage at the switching node LX (FIG. 2A). The frequency of this waveform has decreased to ⅕ the normal operating frequency as a result of loss of inductance due to magnetic field saturating the inductor L (FIG. 2A). The bottom waveform is the output voltage VOUT. Notice that a peak-to-peak voltage ripple likely exceeds typical specification for a typical PWM DC-DC converter.

Figure 4:
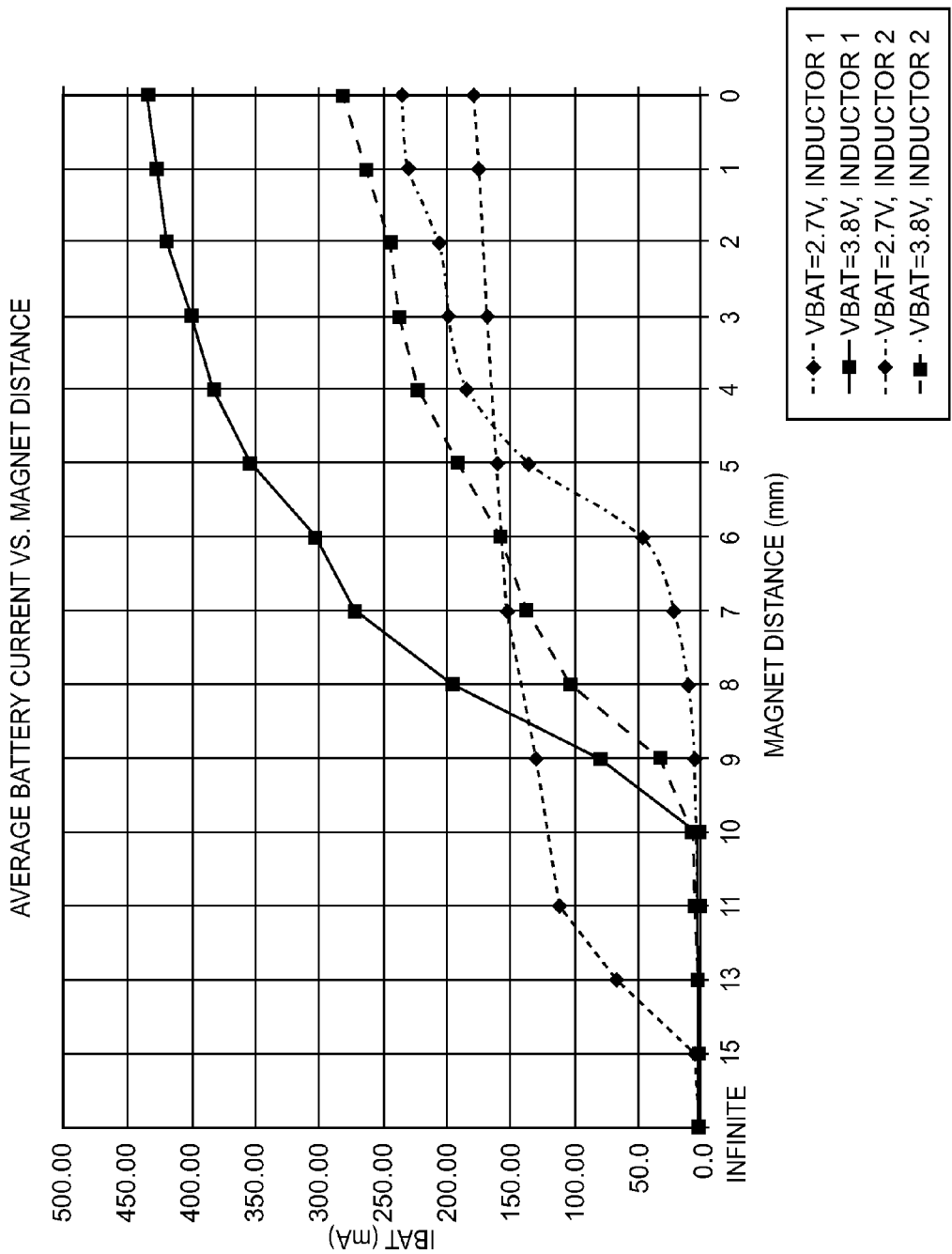
FIG. 4 is a plot of average battery current for the PWM DC-DC converter versus disc magnet distance from the inductor samples.

FIG. 4 shows the increase in the average current drawn from a battery with decreasing magnet distance for two 4.7 µH inductors from different manufacturers. While one of the inductors is a micro lead-frame (MLP) type and the other one is a wire-wound type, the converters exhibit similar effects when exposed to the neodymium magnet in a laboratory experiment. It is important to note that in this particular example, there are three PWM DC-DC converters on the same chip die running simultaneously with output voltages of 1.22V, 1.83V and 2.93V and with 1 mA of load current to each. The average battery current consumption by the chip under normal circumstances is less than 5 mA for this load condition and a battery of 3.8V, while the presence of the magnet can increase the average battery current draw to a relatively high level of 435 mA.

Figure 5:
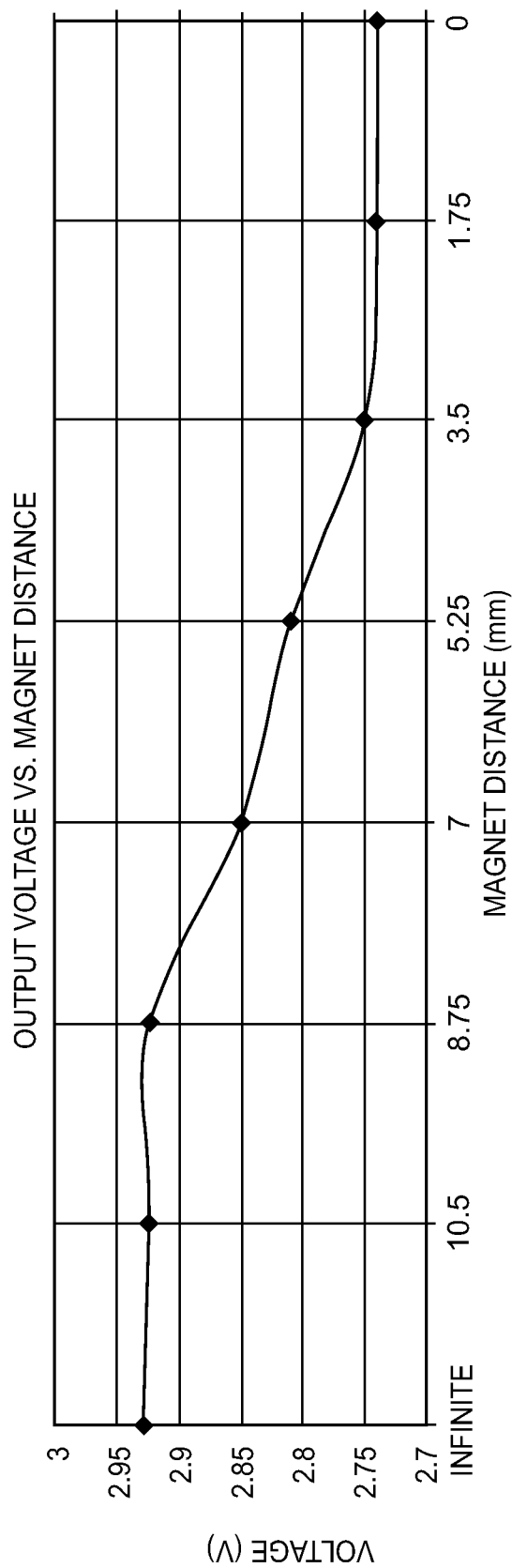
FIG. 5 is a plot of output voltage versus magnet distance from an inductor of a PWM DC-DC converter.

FIG. 5 is a plot of the output voltage of the 2.93V converter versus magnet distance that ranges radially from the inductor L (FIG. 2A). In this case, the converter has a fixed resistive load of about 80 mA and the battery voltage is 3.8V. As evident from this plot, the converter will experience difficulty in regulating the output voltage VOUT as the magnetic field strengthens.

Detecting the External Magnetic Field Over a PWM DC-DC Converter and Protecting the PWM DC-DC Converter:

The above analysis demonstrates that a DC-DC converter running in a PWM mode can be wasteful, dysfunctional, and hazardous, if there is a possibility that the device could be exposed to a strong magnetic field that might be required by another application. Assuming that the DC-DC converter's exposure to this magnetic field is temporary in nature, a system and method is disclosed to protect the PWM DC-DC converter. In general, the disclosed system and method detects the presence of a magnetic field coupling to an inductor coupled to a switching node. The detected presence of the magnetic field can then be used to preemptively and temporarily disable the PWM DC-DC converter in order to protect the PWM DC-DC converter.

Figure 6:
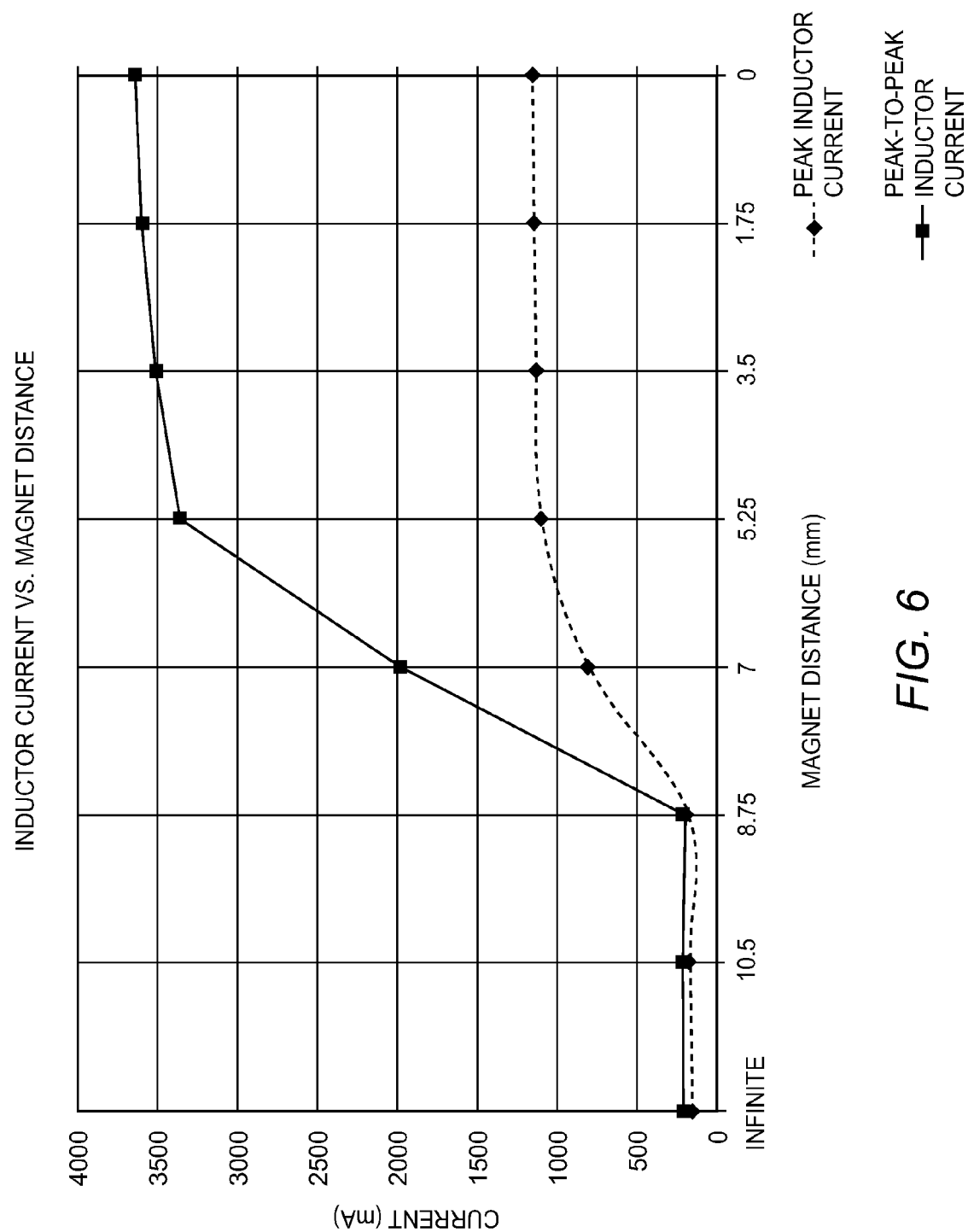
FIG. 6 is a plot of peak inductor current and peak-to-peak inductor current versus magnet distance from an inductor of a PWM DC-DC converter.

FIG. 6 is a graph with plots of peak inductor current and peak-to-peak inductor current versus magnet distance from an inductor of a PWM DC-DC converter. In particular, the plots are of the measured peak (positive maximum) and peak-to-peak inductor current values of the 2.93V PWM DC-DC converter under discussion as a function of the magnet distance. The converter supplies a load current of about 80 mA and the battery voltage is 3.8V.

As can be seen from these plots, the converter experiences a sharp increase in peak inductor current as the magnet gets closer to the inductor and the coupling of the magnetic field with the inductor strengthens. However, as the magnetic field increases to a saturation point, the change in current becomes asymptotically flat. Since the same current flows through the first FET 12 when the current is rising and the second FET 14 when the current is falling, it is possible to indirectly detect an abnormal rise in inductor current due to a magnetic field coupling with the inductor L. Thus, a peak current detector is usable to continuously monitor the LX node voltage during the first FET's 12 ON-time ($T_{ON}$ in FIG. 2B) and compares it against appropriate predetermined reference voltage. The idea behind this is that the voltage drop across the FET resistance is directly proportional to the FET or inductor current assuming the FET resistance is constant. Although this is not completely true in practice due to variation in the semiconductor process, supply voltage, and operating temperature, it is still a practical assumption for the purpose of this disclosure. Once the LX node voltage falls below a certain predefined threshold corresponding to a relatively high inductor current, 700 mA for example, the detector generates a fault-mode flag indicating significant magnetic interference. The fault-mode flag is then used to disable the PWM DC-DC converter. In this manner, excessive current draw from the battery avoided. Thus, active circuitry such as the first FET 12 and the second FET 14, and the passive components such as the inductor L are protected from burn-out. However, this action needs to be taken while maintaining the output voltage VOUT of the PWM DC-DC converter 10 to avoid disrupting the normal operation of external circuitry that is powered by the PWM DC-DC converter 10. Therefore, a temporary fault-mode voltage source that is unaffected by the magnetic field should be used to drive the output node of the PWM DC-DC converter 10 to maintain and regulate the output voltage VOUT as long as the PWM DC-DC converter 10 remains disabled due to the presence of the magnetic field.

Figure 7:
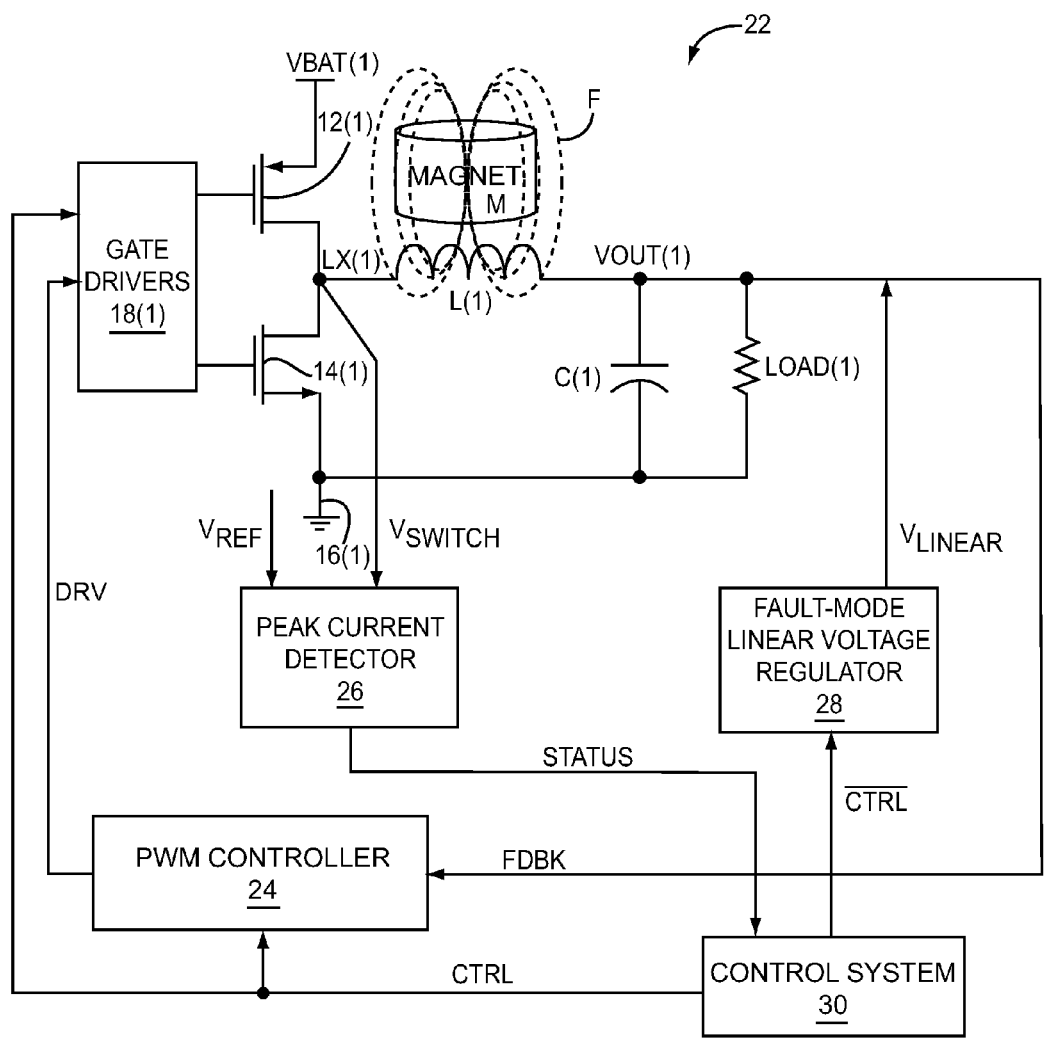
FIG. 7 is a simplified block diagram of a PWM DC-DC converter that is configured in accordance with the present disclosure.

In this regard, FIG. 7 presents a simplified block diagram of a PWM DC-DC converter 22 that is configured in accordance with the present disclosure. The PWM DC-DC converter 22 includes a first FET 12 (1) that has a source coupled to a voltage source VBAT (1) and a drain coupled to a switching node LX (1). The second FET 14 (1) has a drain coupled to the switching node LX (1) and a source coupled to a common node 16 (1). A gate drivers circuit 18 (1) drives a gate of the first FET 12 (1) and a gate of the second FET 14 (1). A PWM controller 24 coupled to the gate drivers circuit 18 (1) outputs a drive signal DRV to control the phase and frequency of switching pulses that are output from the gate drivers circuit 18 (1) that drive the gates of the first FET 12 (1) and the second FET 14 (1). The PWM controller 24 receives a voltage feedback signal FDBK from an output node VOUT (1). A LOAD (1) and a filter capacitor C (1) are coupled in parallel between the output node VOUT (1) and the common node 16 (1). An inductor L (1) is coupled between the switching node and the output node VOUT (1).

A peak current detector 26 is communicatively coupled to the LX (1) node and includes an input that receives a signal characteristic $V_{SWITCH}$ that is proportional to the current that flows through the inductor L (1). The peak current detector 26 also receives a reference voltage signal $V_{REF}$ that the peak current detector 26 compares to the signal characteristic $V_{SWITCH}$. If the signal characteristic $V_{SWITCH}$ exceeds the reference voltage signal $V_{REF}$, the peak current detector outputs a fault-mode flag via a signal STATUS to signify that a low inductance state for the inductor L(1) has occurred. A control system 30 receives the fault-mode flag transmitted by the signal STATUS and responds by outputting a disable flag via a first control signal CTRL that disables the gate drivers circuit 18 (1) and the PWM controller 24.

A linear voltage regulator 28 has an output voltage $V_{Linear}$ to replace the output voltage at the output node VOUT (1) when the gate drivers circuit 18 (1) and/or the PWM controller 24 is disabled. An enable flag transmitted by a second control signal $\overline{CTRL}$ generated by the control system 30 enables the linear voltage regulator 28 to output the voltage $V_{Linear}$ to the output node VOUT (1). The first control signal CTRL and the second control signal $\overline{CTRL}$ are preferably logic signals. Moreover, the second signal $\overline{CTRL}$ is the inverse of the first control signal CTRL. The control system 30 is also configured to output a first reset flag via the first control signal CTRL and a second reset flag via the second control signal $\overline{CTRL}$ after a predetermined time to practically simultaneously re-enable the gate drivers circuit 18 (1) and the PWM controller 24 while disabling the linear voltage regulator 28.

The peak current detector 26 may be adjustable to detect and flag different inductor current levels in order to adjust the sensitivity of the peak current detector 26 to the magnetic field. The PWM DC-DC converter 22 may also be re-enabled by control system 30 after a waiting period to check if the magnet has been removed and whether the PWM DC-DC converter 22 can operate safely and efficiently again. If the peak inductor current appears to be lower than the threshold, the PWM DC-DC converter 22 is allowed to run normally as before; otherwise, it is disabled again and the output reverts to the fault-mode and the linear voltage regulator 28 is enabled. This process continues until the magnetic interference is diminished and the PWM DC-DC converter 22 stabilizes to the switching mode of operation.

PWM Test Results:

Prototypes of the proposed solution having three PWM DC-DC converters based upon the PWM DC-DC converter 22 have been tested. The three PWM DC-DC converters output 1.2V, 1.8V and 2.85V, respectively and are situated on a single chip. The three PWM controllers were evaluated in a laboratory environment with satisfactory results. The present system and method for protecting DC-DC converters works as expected; and measured data shows good correlation with simulation results and theoretical analysis once non-idealities are properly accounted for.

Figure 8:
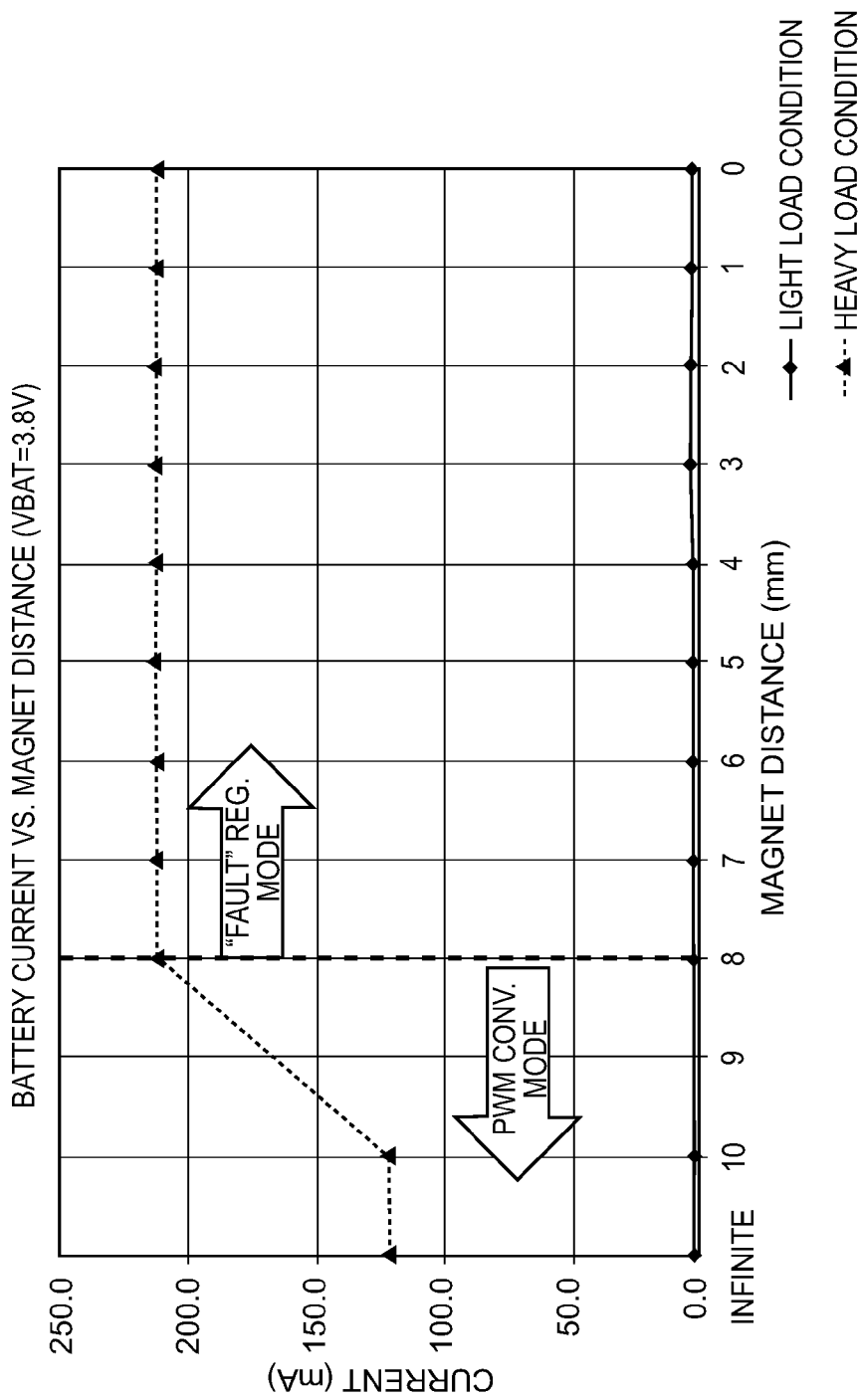
FIG. 8 is a graph of battery current versus magnet distance from the inductor of the PWM DC-DC converter of FIG. 7 for both light and heavy loads.

FIG. 8 shows the plots of measured total battery current for the whole chip over a varying magnetic field for both light and heavy load conditions. For the heavy load condition, the combined load currents of three converters amount to about 211 mA, which roughly equals the battery current when the device enters into an expected regulator mode.

Figure 9:
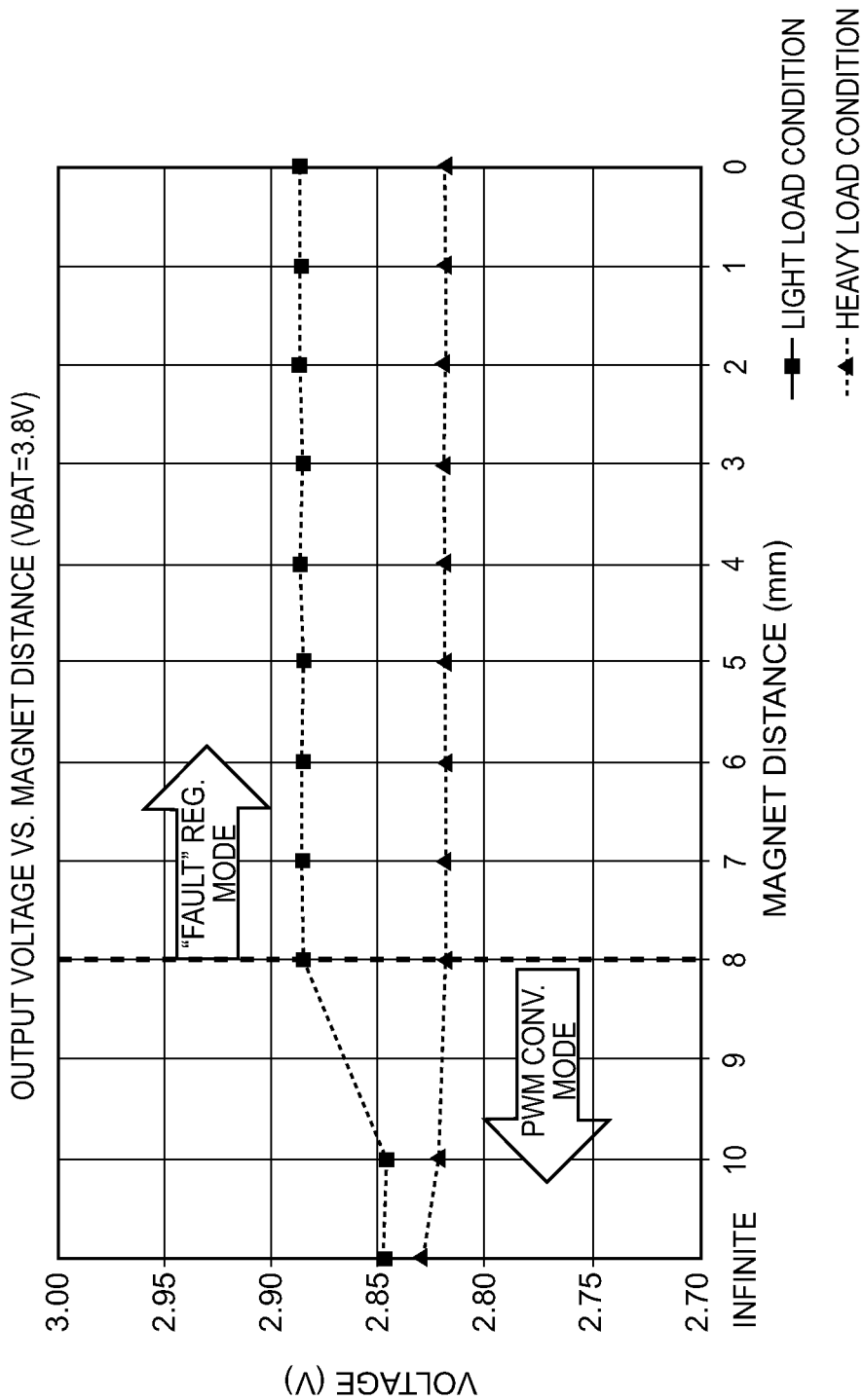
FIG. 9 is a graph of output voltage versus magnet distance from the inductor of the PWM DC-DC converter of FIG. 7 for both light and heavy loads.

FIG. 9 shows the plots of the output voltage of the 2.85V converter for the same test conditions. Once again a neodymium permanent magnet was used for these experiments. As indicated in these figures, the device switches from PWM to regulator mode at a magnet distance of approximately 8 mm, particularly for the 2.85V output. From that point on the battery current draw and the output voltage remain virtually unchanged. This action is in contrast to the wasteful and hazardous behavior shown in FIGS. 4 and 5. For this particular test case, a detection threshold of about 700 mA was used for the PWM peak current detector.

Analysis of a Related Art Pulse Frequency Modulation (PFM) DC-DC Converter

Figure 10:
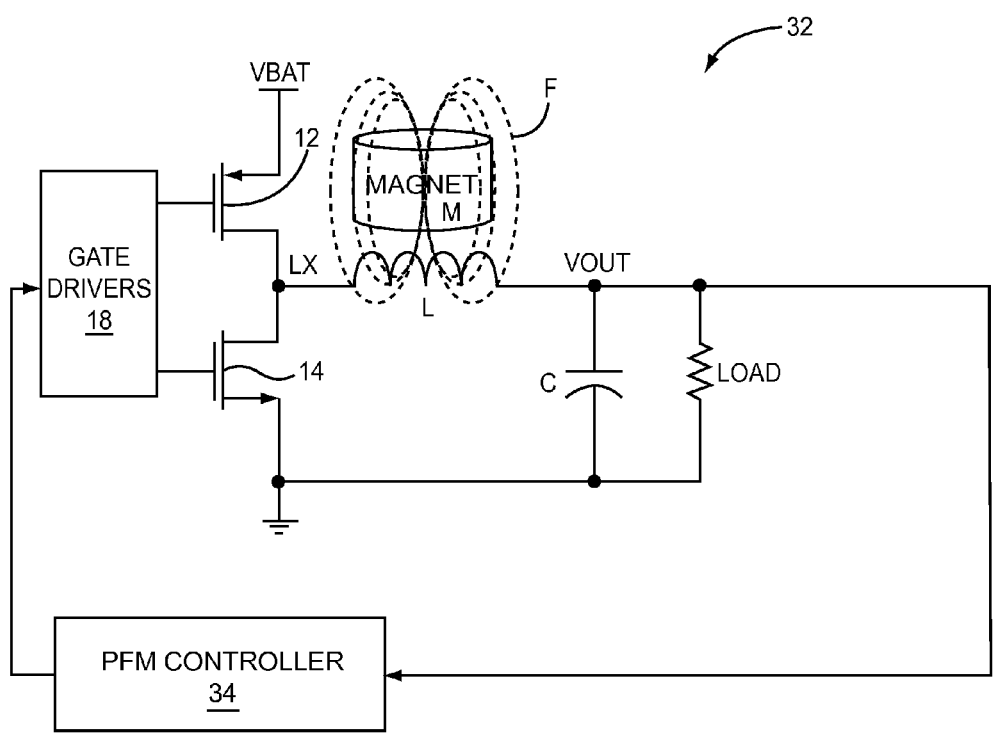
FIG. 10 is a simplified block diagram of a pulse frequency modulation (PFM) DC-DC converter.

FIG. 10 is a simplified block diagram of a related art pulse frequency modulation (PFM) DC-DC converter 32 that comprises the first field effect transistor (FET) 12 and the second FET 14. The PFM DC-DC converter 32 has a configuration that is similar to the configuration of the PWM DC-DC converter 10 (FIG. 2A). An exception is that the PFM DC-DC converter 32 includes a PFM controller 34 in place of the PWM controller 20 (FIG. 2A). In this case, the PFM controller 34 is coupled to the gate drivers circuit 18 to control the phase and frequency of switching pulses that are output from the gate drivers circuit 18 that drive the gates of the first FET 12 and the second FET 14. The PFM controller 34 receives voltage feedback from the output node VOUT.

Figure 11:
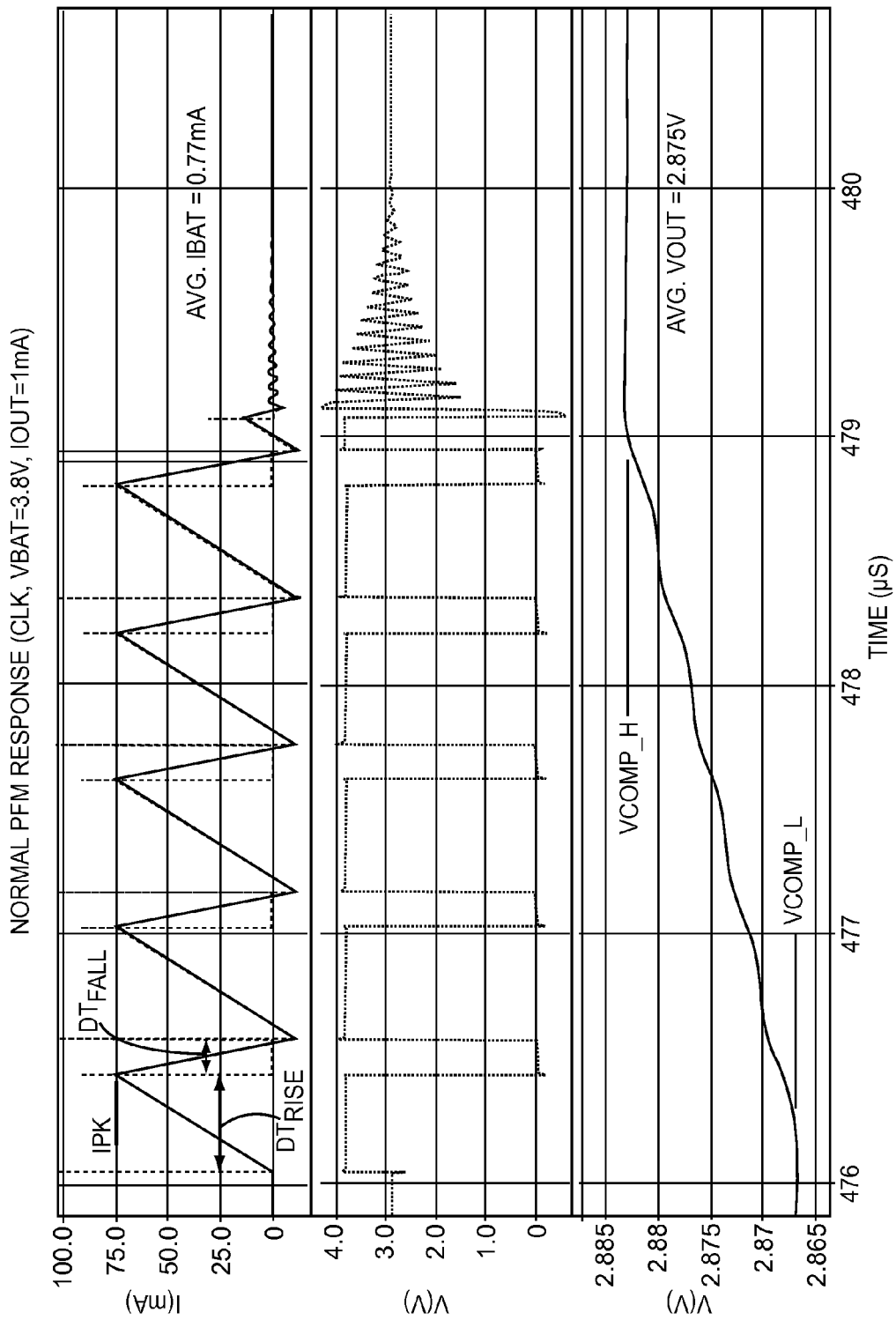
FIG. 11 is plot of waveforms associated with the normal operation of the PFM DC-DC converter of FIG. 10.

FIG. 11 shows the relevant simulated waveforms of the PFM DC-DC converter 32 with an output voltage VOUT of 2.875V. The top waveform shown in solid line represents the inductor current IL, which is a saw-tooth type waveform. The middle waveform shown in dashed line represents the voltage at the switching node LX. The lower waveform shown in solid line represents the output voltage VOUT. As can be ascertained from the upper waveform shown in dashed line, the first FET 12 and the second FET 14 are enabled only when the output voltage VOUT falls below a predetermined value (Vcomp_L) and they remain enabled till the output voltage VOUT is pumped up to a higher threshold (Vcomp_H). During this switching activity, the inductor current is allowed to swing between two predefined limits, which are typically zero and a small positive number as dictated by the load current range supported by PFM operation. At this stage, power is supplied to the load directly from the battery VBAT and some energy is transferred and stored to the output capacitor C for later use. Once the output voltage reaches Vcomp_H threshold, switching stops and the first FET 12 and the second FET 14 go into a high-impedance state disconnecting the battery VBAT from the load and allowing the output capacitor C to supply power to the load. At this time the charge stored on the capacitor and hence the output voltage starts to decay at a rate proportional to the load current. When the output voltage reaches Vcomp_L, the switching cycle starts again and the process continues. This mode of operation for a converter is particularly useful and quite efficient when the load current requirements are low.

The effects that the magnetic-field-induced loss of inductance of the output inductor L causes to a PFM DC-DC converter are discussed with the aid of the following equation for inductor voltage. When the first FET 12 and the second FET 14 are switching, the voltage across the inductor L is defined by, $$v_L = L \cdot \frac{di_L}{dt} \Rightarrow \frac{di_L}{dt} = \frac{v_L}{L}$$

where, $v_L$ = voltage across the inductor $L$ = inductance of the inductor $\frac{di_L}{dt}$ = rate of change of the inductor current Assuming VBAT=3.8V, VOUT=2.875V and a peak-to-peak inductor current of 87 mA (as in FIG. 11), the approximate inductor current rise time, $$dt_{rise} = \begin{cases} 442 \text{ ns for } L = 4.7 \text{ μH (no magnet present)} \\ 16.9 \text{ ns for } L = 0.18 \text{ μH (magnet at 0-1 mm distance)} \end{cases}$$

Figure 12:
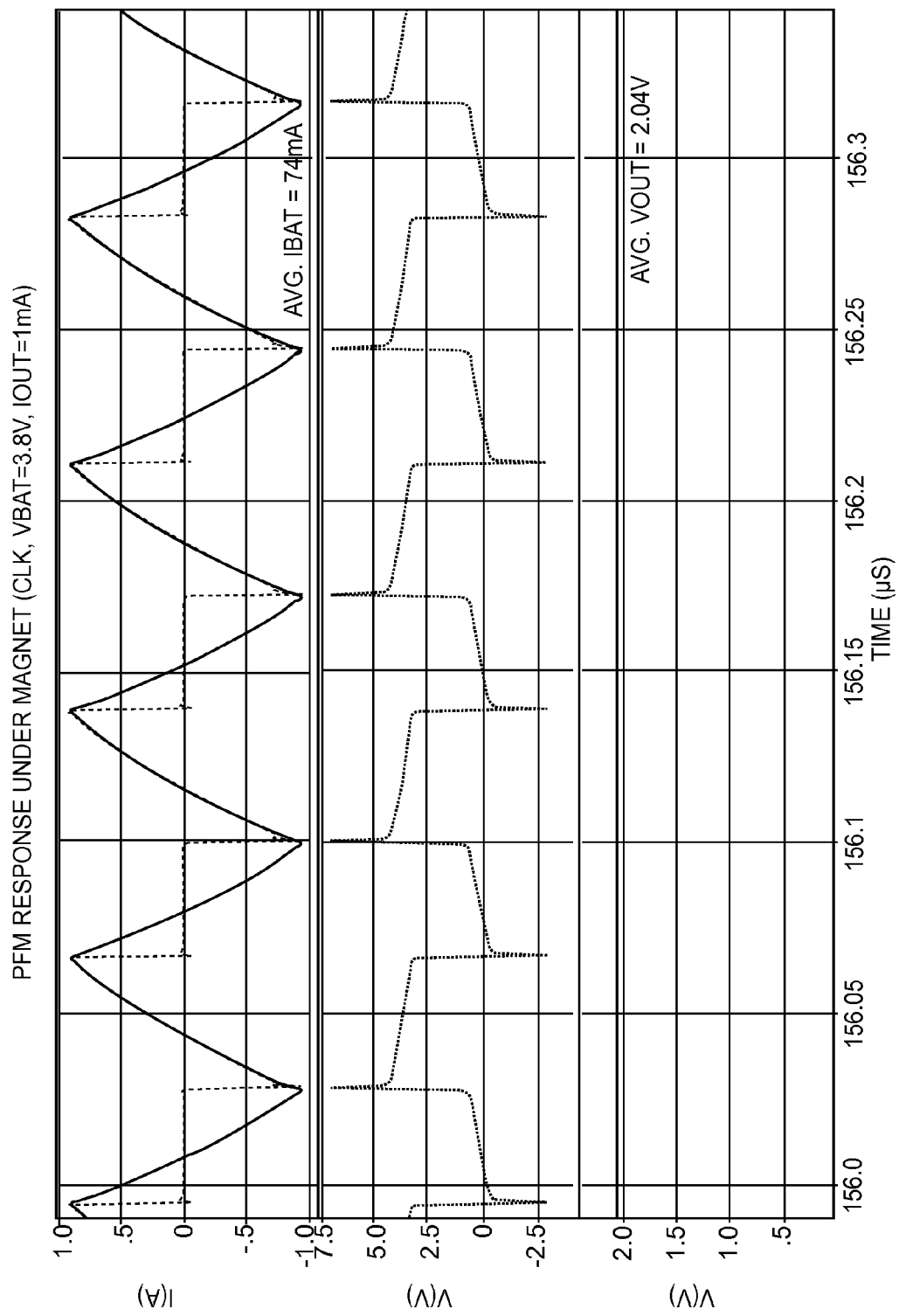
FIG. 12 is plot of waveforms associated with the operation of the PFM DC-DC converter of FIG. 10 under a magnet in close proximity.

In this analysis, complementary metal oxide semiconductor (CMOS) comparators are used to control the inductor current are assumed to be ideal ones (i.e., without any propagation delays). However, in reality CMOS comparators have propagation delays anywhere in the range from a few nanoseconds to several tens of nanoseconds. This propagation delay is typically small compared to the normal inductor current rise or fall time as shown in the calculation above, thereby not causing significant overshoot or undershoots of the inductor current. However, as the inductance value drastically goes down due to the insertion of a magnetic field, the $$\frac{di_L}{dt}$$

term becomes much steeper. Thus, allowing the inductor current to overshoot and undershoot in excessive amounts (as shown in FIG. 12).

One problem associated with excess amounts of inductor current overshoot and undershoot is that the average battery current drawn by a CMOS converter increases to much higher levels compared to normal operation, thus making the PFM DC-DC converter 32 (FIG. 10) inefficient, ineffective, and potentially unsafe. Another problem is that the output voltage VOUT cannot be maintained, especially if the target output voltage is a relatively large percentage of the battery, for example, a VOUT of 2.875V at a VBAT of 3.8V as used in this example. Please refer to the lower waveform shown in dashed line in FIG. 12. This is because the inductor current rise and fall times now become roughly equal due to the CMOS comparator delays becoming the dominant part in the rise/fall times. This situation does not allow a high enough duty cycle for the switching pulses that is required to maintain the voltage.

Figure 13:
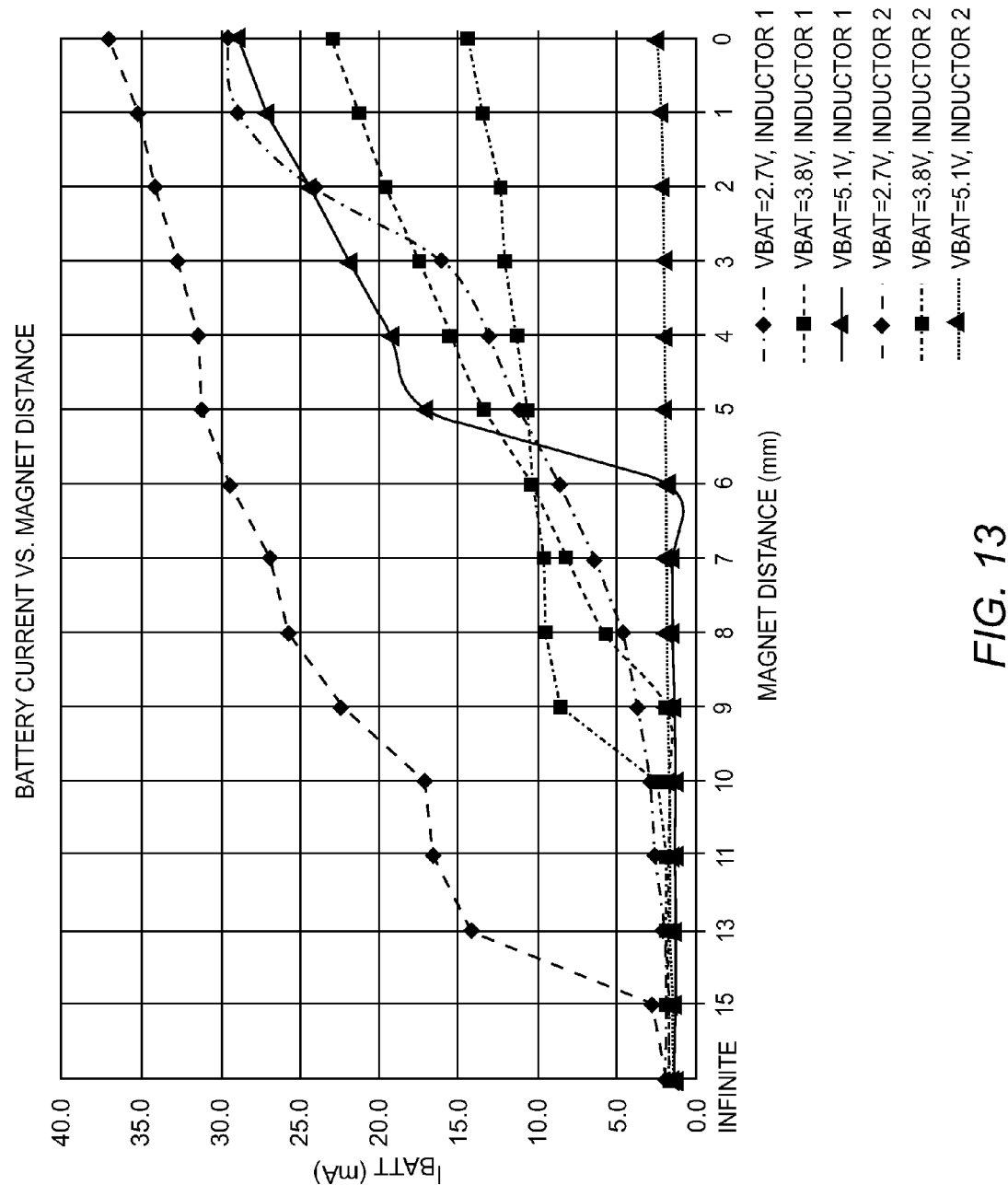
FIG. 13 is a plot of average battery current for the PFM DC-DC converter versus disc magnet distance from the inductor samples for various output voltages.

FIG. 13 shows the increase in current drawn from the battery with decreasing magnet distance for two 4.7 µH inductors from different manufacturers. While one of the inductors is an MLP-type and the other one is a wire-wound, the converters exhibit similar effects when exposed to the neodymium magnet in a real-life laboratory experiment. However, it is important to note that when the magnetic interference is not present, the current consumption by the device is only 1.7 mA at a battery voltage of 3.8V.

Figure 14:
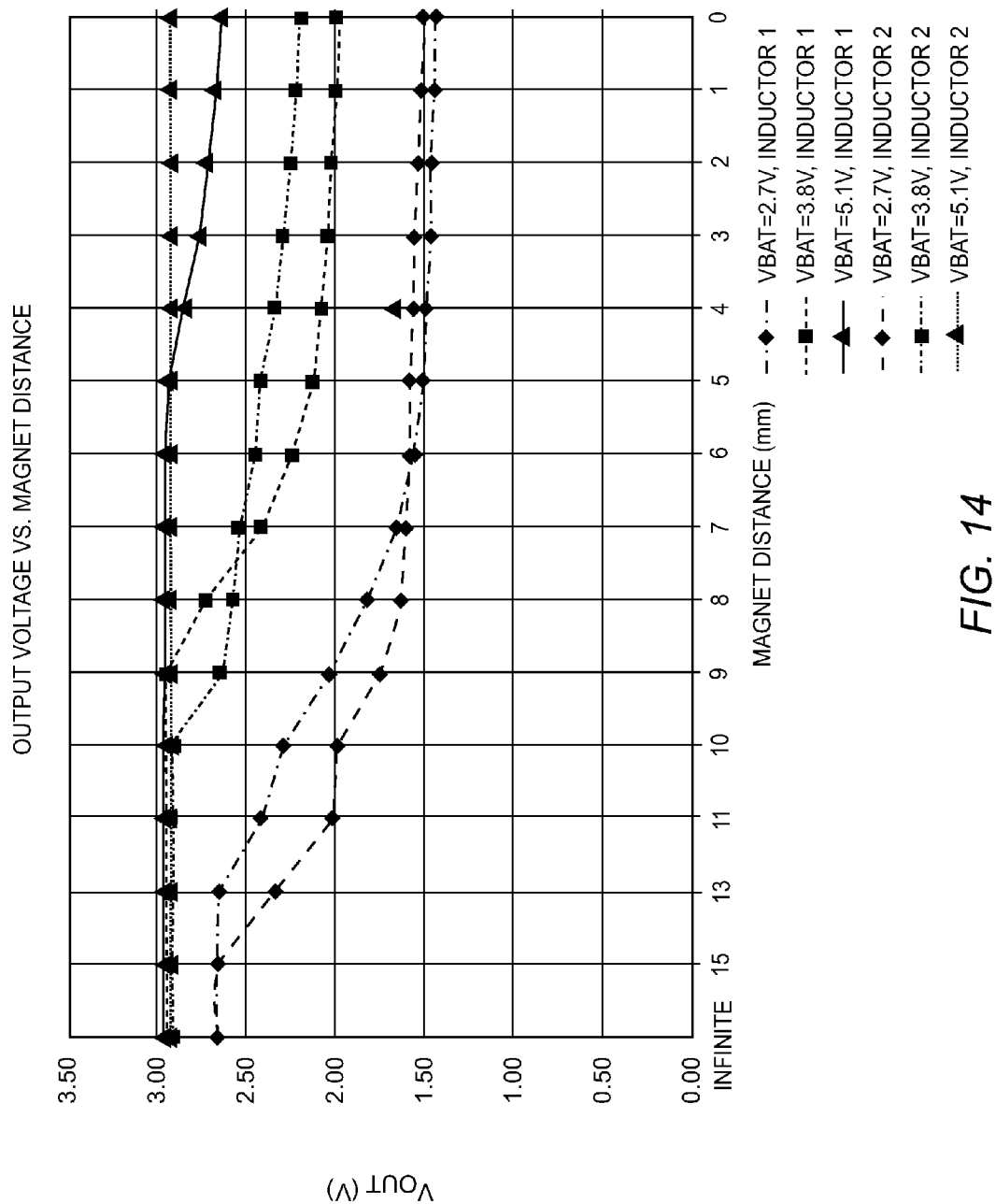
FIG. 14 is a plot of output voltage for the PFM voltage DC-DC converter versus disc magnet distance from the inductor samples for various output voltages.

FIG. 14 shows the drop in output voltage of the PFM DC-DC converter 32 over magnet distance for the same inductors and battery voltages mentioned above. As evident from these plots, it becomes more difficult for the PFM DC-DC converter 32 to maintain the output voltage VOUT when the battery voltage VBAT is reduced, thus supporting the aforementioned reasoning about the loss of regulation.

Detecting the External Magnetic Field Over a PFM DC-DC Converter and Protecting the PFM DC-DC Converter:

Considering the above analysis and discussions, it is not too difficult to come to a conclusion that a DC-DC converter running in PFM mode can be wasteful and even dysfunctional and unsafe if there is a possibility that the device could be exposed to a strong magnetic field that might be required by another application. Assuming that exposure to this magnetic field is temporary in nature, a protection system and method is disclosed by which the magnetic presence can be detected and the PFM DC-DC converter can be disabled as the field strength becomes threatening while maintaining the output voltage in the application by enabling a parallel linear voltage regulator.

The loss of inductance of a typical SMD power-inductor under the presence of a magnetic field is discussed above. In addition to increased power consumption and lowered output voltage, another side-effect of this inductance loss is the sharp increase of "pulse frequency" in a PFM controller, which is defined by:

$$f_{pulse} = \frac{1}{(dt_{rise} + dt_{fall})} = \frac{Vout(Vbat - Vout)}{Ipk \cdot L \cdot Vbat}$$

where, $dt_{rise}$ = inductor current rise time $dt_{fall}$ = inductor current fall time $Ipk$ = peak-to-peak inductor current and other parameters have their usual meanings.

The above equation indicates that the pulse frequency is inversely proportional to the inductance assuming everything else is constant. However, in practice, the Ipk value cannot be held constant under the magnetic field due to the propagation delays of the internal comparators, as discussed earlier and illustrated in FIG. 13. Also, as shown in FIG. 12 and FIG. 14, the output voltage VOUT drops as the magnet gets closer to the inductor L. Therefore, although the inductance decreases from 4.7 µH to the relatively extreme low of 0.18 µH when the magnet is the closest to the output SMD inductor, the pulse frequency does not rise proportionally.

Figure 15:
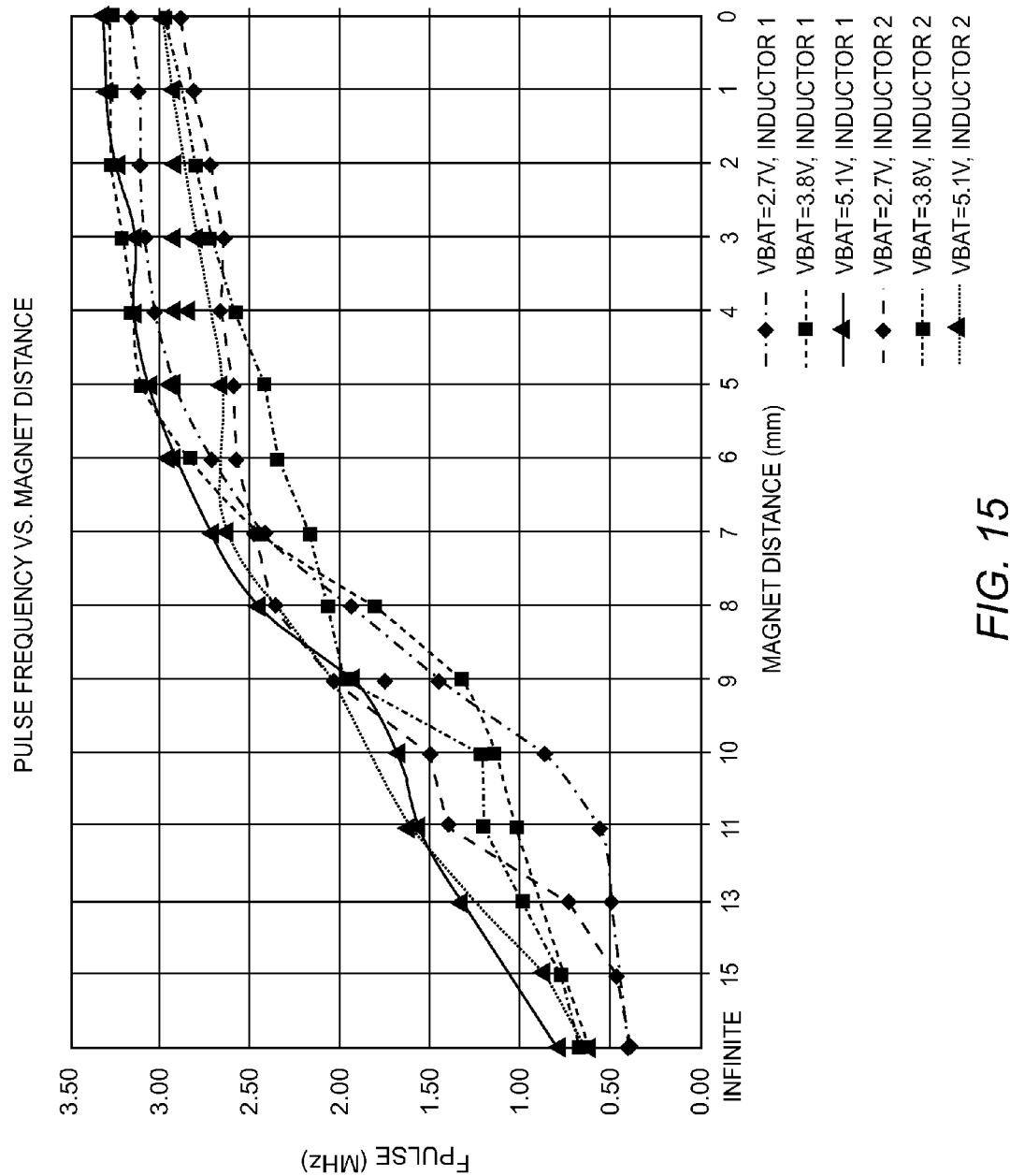
FIG. 15 is a plot of pulse frequency for the PFM voltage DC-DC converter versus disc magnet distance from the inductor samples for various output voltages.

FIG. 15 shows the measured pulse frequency of the PFM DC-DC controller under discussion as a function of the magnet distance for the same two inductors mentioned earlier. It is evident from these plots that the increase in pulse frequency under the magnet is still quite significant, and hence it can be detected and flagged with the help of a proper digital mechanism. As a result, a frequency detector is disclosed that continuously monitors the pulse frequency at the switching node LX and compares it digitally against a known constant clock frequency. Once the pulse frequency exceeds a pre-defined threshold, 5 MHz for example, the digital detector sends a fault-mode flag indicating significant magnetic interference. This fault-mode flag is then used to disable the PFM controller in order to avoid excessive current draw from the battery, loss of output voltage regulation and to protect the active circuitry and inductor from burn-out. However, this action needs to be taken while maintaining the output voltage of the DC-DC converter to avoid disrupting the normal operation of the other circuit blocks in the system that this PFM converter supplies power to. Therefore, a temporary fault-mode linear voltage regulator is used to drive the output node of the converter to maintain and regulate the voltage as long as the converter remains disabled due to magnetic presence. Since a linear regulator does not require an inductor for its operation, it is unaffected by the presence of the magnetic field.

Figure 16:
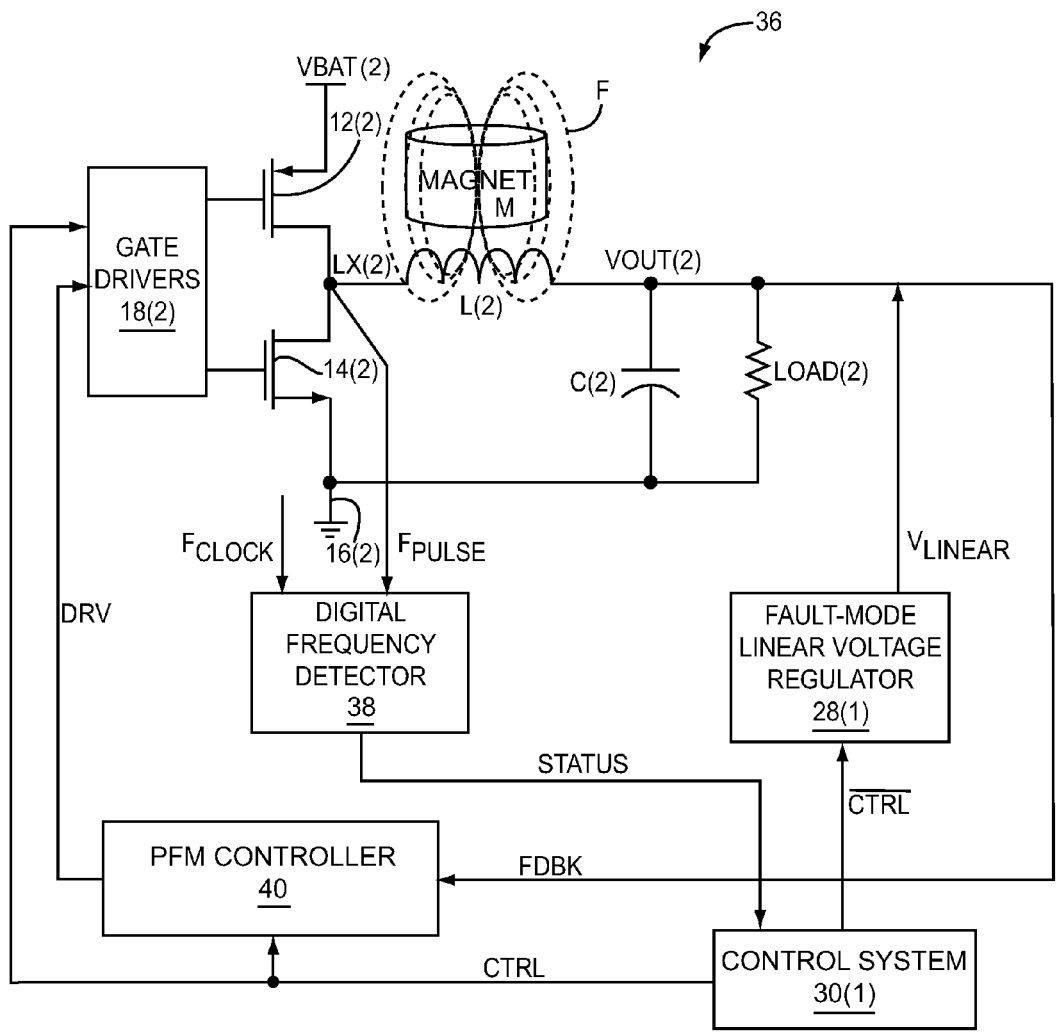
FIG. 16 is a simplified block diagram of a PFM DC-DC converter that is configured in accordance with the present disclosure.

FIG. 16 is a simplified block diagram of a PFM DC-DC converter 36 that is configured in accordance with the present disclosure. The PFM DC-DC converter 36 includes a first FET 12 (2) that has a source coupled to a voltage source VBAT (2) and a drain coupled to a switching node LX (2). A second FET 14 (2) has a drain coupled to the switching node LX (2) and its source coupled to a common node 16 (2). The gate drivers circuit 18 (2) drives a gate of the first FET 12 (2) and a gate of the second FET 14 (2). A PFM controller 40 coupled to the gate drivers circuit 18 (2) outputs a drive signal DRV to control the phase and frequency of switching pulses that are output from the gate drivers circuit 18 (2) that drive the gates of the first FET 12 (2) and the FET 14 (2). The PFM controller 40 receives a voltage feedback signal FDBK from an output node VOUT (2). A LOAD (2) and a filter capacitor C (2) are coupled in parallel between the output node VOUT (2) and the common node 16 (2). An inductor L (2) is coupled between the switching node and the output node VOUT (2).

A digital frequency detector 38 is communicatively coupled to the LX (2) node and includes an input that receives a signal characteristic $F_{PULSE}$ that is proportional to the current that flows through the inductor L (2). The digital frequency detector 38 also receives a reference frequency signal $F_{CLOCK}$ that the digital frequency detector 38 compares to the signal characteristic $F_{PULSE}$. If the signal characteristic $F_{PULSE}$ differs from the reference frequency signal $F_{CLOCK}$ by a predetermined amount, the digital frequency detector 38 outputs a fault-mode flag via a signal STATUS to signify that a low inductance state for the inductor L(2) has occurred. A control system 30 (1) receives the fault-mode flag transmitted by the signal STATUS and responds by outputting a disable flag via a first control signal CTRL that disables both the gate drivers circuit 18 (2) and the PFM controller 40.

A linear voltage regulator 28 (1) has an output voltage $V_{Linear}$ to replace the output voltage at the output node VOUT (2) when the gate drivers circuit 18 (2) and/or the PFM Controller 38 is disabled. An enable flag transmitted via a second signal $\overline{CTRL}$ generated by the control system 30 (1) enables the linear voltage regulator 28 (1) to output the voltage $V_{Linear}$ to the output node VOUT (2). The first control signal CTRL and the second control signal $\overline{CTRL}$ are preferably logic signals. Moreover, the second signal $\overline{CTRL}$ is the inverse of the first control signal CTRL.

The control system 30 (1) is also configured to output a first reset flag via the first control signal CTRL and a second reset flag via the second control signal $\overline{CTRL}$ after a predetermined time to practically simultaneously re-enable the gate drivers circuit 18 (2) and the PFM controller 40 while disabling the linear voltage regulator 28 (1).

The digital frequency detector 38 may also be adjustable to detect and flag different frequency thresholds in order to adjust the sensitivity of the digital frequency detector 38 to the magnetic field. The PFM DC-DC converter 36 may be re-enabled by the control system 30 (1) after a waiting a predetermined time to check if the magnet has been removed and whether the PFM DC-DC converter 36 can operate safely and efficiently again. If the pulse frequency appears to be lower than the threshold, the PFM DC-DC converter 36 is allowed to run normally as before; otherwise, it is disabled again and the output reverts to a fault-mode and the linear regulator 28(1) is enabled. This process continues until the magnetic interference is diminished and the PFM DC-DC converter 36 stabilizes to a normal mode of operation.

Figure 17:
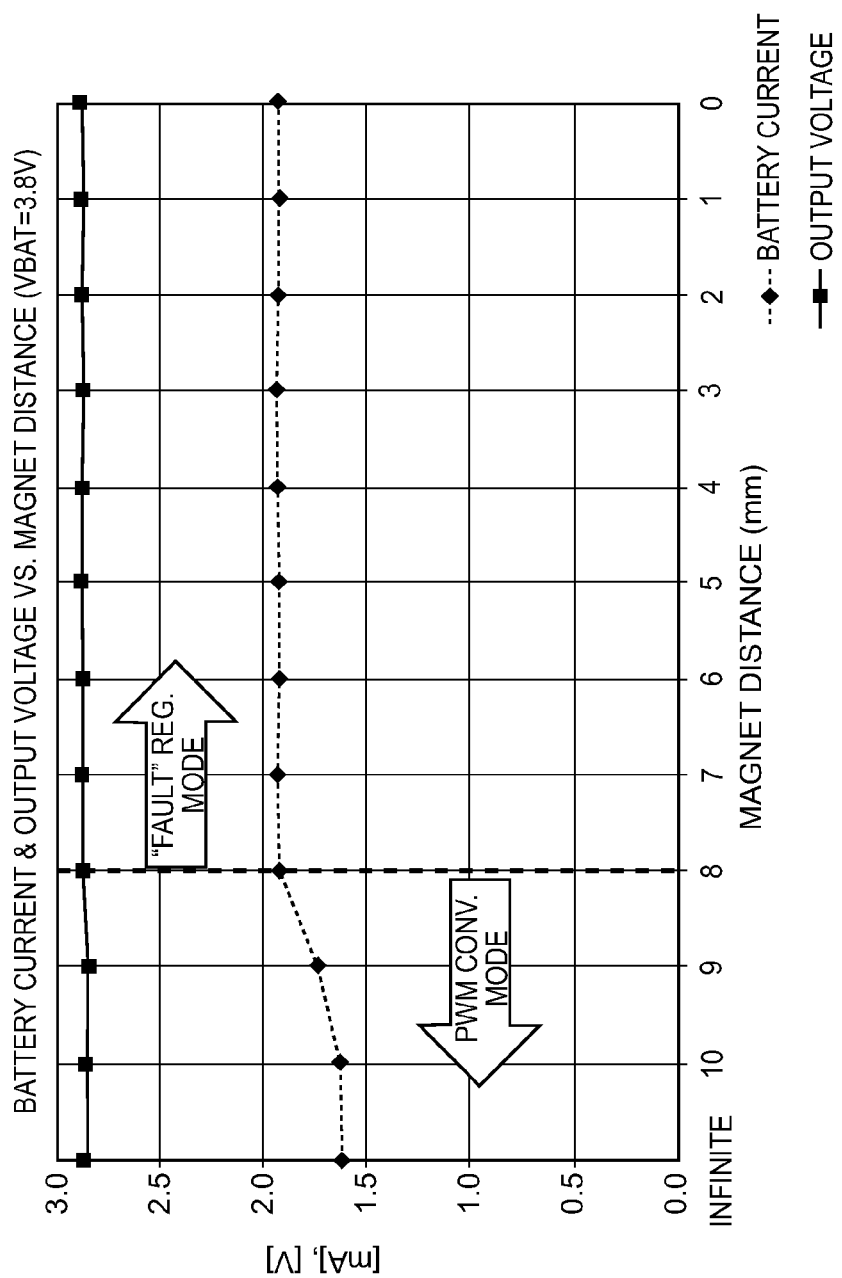
FIG. 17 is a graph of battery current and output voltage versus magnet distance from the inductor of the PWM DC-DC converter of FIG. 16.

PFM Test Results:

Prototypes of PFM DC-DC converter 36 have been evaluated in a lab with satisfactory results. The disclosed method works as expected; and measured data show good correlation with simulation results and theoretical analysis once the non-idealities are properly accounted for. FIG. 17 shows the plots of measured battery current and output voltage over a varying magnetic field. Once again a neodymium permanent magnet was used. As indicated in FIG. 17, the device switches from PFM to fault-mode at a magnet distance of approximately 8 mm, and from that point on the battery current draw and the output voltage remain virtually unchanged. This action is in contrast to the wasteful and potentially hazardous behavior shown in FIG. 13 and FIG. 14. For this particular test case, a detection threshold of about 4.6 MHz was used for the digital frequency detector 38.

Those skilled in the art will recognize improvements and modifications to the embodiments of the present disclosure. For example, it is to be understood that the protection system and method of the present disclosure is applicable to multi-mode DC-DC converters that include both PWM and PFM modes. All such improvements and modifications are considered within the scope of the concepts disclosed herein and the claims that follow.

What is claimed is:

1. A protection system for a direct current to direct current voltage converter (DC-DC converter) comprising:
   a frequency detector circuit configured to monitor a pulse frequency of a pulse signal generated by the DC-DC converter at a node formed between a switching output of the DC-DC converter and an inductor coupled between the switching output and a load output, wherein the pulse frequency of the pulse signal varies with an external magnetic field coupling with the inductor;
   a linear regulator having an output coupled to the load output of the DC-DC converter; and
   a control system configured to disable the load output of the DC-DC converter and enable the output of the linear regulator when the frequency detector circuit detects that the pulse frequency has moved outside a predetermined threshold range as a result of the external magnetic field coupling with the inductor exceeding a given magnetic field strength.

2. The protection system of claim 1 wherein the control system is configured to output a logic signal that disables the DC-DC converter thereby disabling the load output of the DC-DC converter when the frequency detector circuit detects that the pulse frequency has moved outside the predetermined threshold range.

3. The protection system of claim 1 wherein the control system is configured to output a logic signal that enables the output of the linear regulator when the frequency detector circuit detects that the pulse frequency has moved outside the predetermined threshold range.

4. The protection system of claim 1 wherein the control system is further configured to:
   disable the output of the linear regulator after a predetermined time period following a disabling of the load output of the DC-DC converter; and
   enable the load output of the DC-DC converter after the predetermined time period.

5. The protection system of claim 4 wherein the control system has a logic output coupled to a control input of the DC-DC converter for enabling and disabling the load output of the DC-DC converter.

6. The protection system of claim 4 wherein the control system has a logic output coupled to a control input of the linear regulator for enabling and disabling the output of the linear regulator.

7. The protection system of claim 1 wherein the DC-DC converter further comprises:
   a first transistor having a first output terminal coupled to a switching node and a first driver input;
   a second transistor having a second output terminal coupled to the switching node and a second driver input;
   an inductor coupled between the switching node and the load output; and
   a driver circuit having a first driver output coupled to the first driver input and a second driver output coupled to the second driver input and a control input.

8. The protection system of claim 7 wherein the inductance of the inductor decreases as an external magnetic field coupling with the inductor increases in magnetic strength.

9. The protection system of claim 7 further including a pulse width modulation (PWM) controller having a feedback input coupled to the load output and a controller output coupled to the control input of the driver circuit.

10. The protection system of claim 7 further including a pulse frequency modulation (PFM) controller having a feedback input coupled to the load output and a controller output coupled to the control input of the driver circuit.

11. A method of protecting a DC-DC converter comprising:
   monitoring a pulse frequency of a pulse signal generated by the DC-DC converter via a pulse detector circuit having an input coupled to a node formed between a switching output of the DC-DC converter and an inductor coupled between the switching output and a load output, wherein the pulse frequency of the pulse signal varies with an external magnetic field coupling with the inductor;
   disabling the load output of the DC-DC converter via a control system when the pulse detector circuit detects that the pulse frequency has moved outside a predetermined threshold as a result of the external magnetic field coupling with the inductor exceeding a given magnetic field strength; and enabling an output of a linear regulator via the control system to replace the load output of the DC-DC converter.

12. The method of claim 11 wherein disabling the load output of the DC-DC converter is accomplished automatically via the control system outputting a logic signal that disables the DC-DC converter.

13. The method of claim 11 wherein enabling the output of the linear regulator is accomplished automatically via the control system outputting a logic signal that enables the linear regulator.

14. The method of claim 11 further comprising:
disabling the output of the linear regulator via the control system after a predetermined time following a disabling of the load output of the DC-DC converter; and
enabling the load output of the DC-DC converter via the control system.

15. The method of claim 14 wherein disabling the output of the linear regulator is accomplished via the control system outputting a logic signal that disables the linear regulator.

16. The method of claim 14 wherein enabling the load output of the DC-DC converter is accomplished via the control system outputting a logic signal that enables the DC-DC converter.

17. The method of claim 11 wherein the DC-DC converter further comprises:
a first transistor having a first output terminal coupled to a switching node and a first driver input;
a second transistor having a second output terminal coupled to the switching node and a second driver input;
an inductor coupled between the switching node and the load output; and
a driver circuit having a first driver output coupled to the first driver input and a second driver output coupled to the second driver input and a control input.

18. The method of claim 17 wherein the inductance of the inductor decreases as an external magnetic field coupling with the inductor increases in magnetic strength.

19. The method of claim 17 further including a PWM controller having a feedback input coupled to the load output and a controller output coupled to the control input of the driver circuit.

20. The method of claim 17 further including a PFM controller having a feedback input coupled to the load output and a controller output coupled to the control input of the driver circuit.

\* \* \* \* \*

UNITED STATES PATENT AND TRADEMARK OFFICE
CERTIFICATE OF CORRECTION

PATENT NO. : 8,933,685 B2
APPLICATION NO. : 13/426947
DATED : January 13, 2015
INVENTOR(S) : Mohammad A. Adeeb et al.

It is certified that error appears in the above-identified patent and that said Letters Patent is hereby corrected as shown below:

In the Specification,

In column 4, at lines 20-24, replace "$\Delta I = \dfrac{Vout(1-D)}{fL}$ where, $f$ = switching frequency, $L$ = inductance of the inductor"

with --

$Vout = D \cdot Vbat$ where, $D = \dfrac{T_{ON}}{T_{OFF}}$ = duty cycle of the switching pulses. --

In column 4, at lines 29-30, replace "$\Delta I = \begin{cases} 53\text{mA for } L = 4.7\mu H \text{ (no magnet present)} \\ 1389\text{mA for } L = 0.18\mu H \text{ (magnet at 0-1mm distance)} \end{cases}$"

with -- $\Delta I = \dfrac{Vout(1-D)}{fL}$ where, $f$ = switching frequency, $L$ = inductance of the inductor --

In column 4, at lines 39-42, replace "$Vout = D \cdot Vbat$ where, $D = \dfrac{T_{ON}}{T_{OFF}}$ = duty cycle of the switching pulses."

with -- $\Delta I = \begin{cases} 53\text{mA for } L = 4.7\mu H \text{ (no magnet present)} \\ 1389\text{mA for } L = 0.18\mu H \text{ (magnet at 0-1mm distance)} \end{cases}$ --

Signed and Sealed this
Ninth Day of June, 2015

Michelle K. Lee
*Director of the United States Patent and Trademark Office*